United States Patent [19]

Bergmans

[11] Patent Number: 4,905,254
[45] Date of Patent: Feb. 27, 1990

[54] ARRANGEMENT FOR COMBATING INTERSYMBOL INTERFERENCE AND NOISE

[75] Inventor: Johannes W. M. Bergmans, Tokyo, Japan

[73] Assignee: U.S. Philips Corporation, New York, N.Y.

[21] Appl. No.: 203,652

[22] Filed: Jun. 7, 1988

[30] Foreign Application Priority Data

Jun. 9, 1987 [NL] Netherlands ............ 8701333

[51] Int. Cl.$^4$ ............................................. H04B 3/06
[52] U.S. Cl. ...................................... 375/14; 371/43; 375/94; 375/101
[58] Field of Search ....................... 375/12, 14, 18, 94, 375/99, 101; 371/43; 333/18; 360/39, 40

[56] References Cited

U.S. PATENT DOCUMENTS

| 3,872,381 | 3/1975 | Yamamoto et al. | 375/101 |
|---|---|---|---|
| 4,367,495 | 1/1983 | Mita et al. | 375/18 |
| 4,615,038 | 9/1986 | Lim et al. | 375/14 |
| 4,646,305 | 2/1987 | Tretter et al. | 375/18 |

OTHER PUBLICATIONS

E. Biglieri et al., "Adaptive Cancellation of Nonlinear Intersymbol Interference for Voiceband Data Transmission", IEEE J. Select. Areas Commun., vol. SAC-2, pp. 765-777, Sep. 1984.
W. U. Lee et al., "A Maximum-Likelihood Sequence Estimator with Decision Feedback Equalization", IEEE Trans. Commun., vol. COM-25, No. 9, 971-979, Sep. 1977.
J. G. Proakis, *Digital Communications*, McGraw Hill, New York, 1983, Chapter 6, Section 6.3, pp. 351-357.
P. Kabal et al., "Partial-Response Signaling", IEEE Trans. Commun., vol. COM-23, No. 9, pp. 921-934, Sep. 1975.
K. Wesolowski, "On the Performance and Convergence of the Adaptive Canceller of Intersymbol Interference in Data Transmission", IEEE Trans. Commun., vol. COM-33, No. 5, pp. 425-432, May 1985.
J. Bergmans et al., "A Simulation Study of Intersymbol Interference Cancellation", AEU, vol. 41, No. 1, pp. 33-37, 1987.
J. Bergmans, "Discrete-Time Models for Digital Magnetic Recording", Philips J. Res., vol. 41, No. 6, pp. 531-558, 1986.
J. Kobayashi et al., "On Decoding of Correlative Level Coding Systems with Ambiguity Zone Detection", IEEE Trans. Commun. Technol., vol. COM-19, No. 4, pp. 467-477, Aug. 1971.

*Primary Examiner*—Benedict V. Safourek
*Attorney, Agent, or Firm*—Thomas A. Briody; Jack E. Haken; Anne E. Barschall

[57] ABSTRACT

An arrangement for combating intersymbol interference and noise, which are introduced into a data signal ($a_k$) transmitted at a symbol rate 1/T by a dispersive transmission channel (CH), comprises an adaptive equalizer (EQ) with a symbol detector (ID) for forming tentative symbol decisions ($\tilde{a}_k$) as well as a post-detector (PD) for forming final symbol decisions ($\hat{a}_{k-M}$) using an auxiliary signal which is derived from the transmitted data signal ($r_k$) at the input of the arrangement. By using a priori knowledge of the main character of the transfer characteristic of the transmission channel (CH) and by using as an auxiliary signal for the post-detector (PD) the input signal ($a_k$) of the symbol detector (ID) in lieu of the transmitted data signal ($r_k$), this post-detector (PD) can be arranged in a non-adaptive and thus simpler way without a resulting noticeable loss of transmission quality. (FIG. 4).

7 Claims, 4 Drawing Sheets

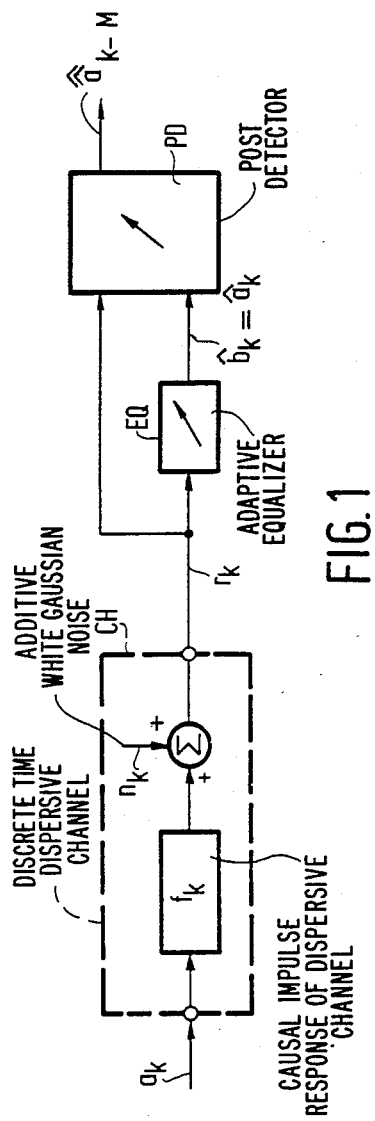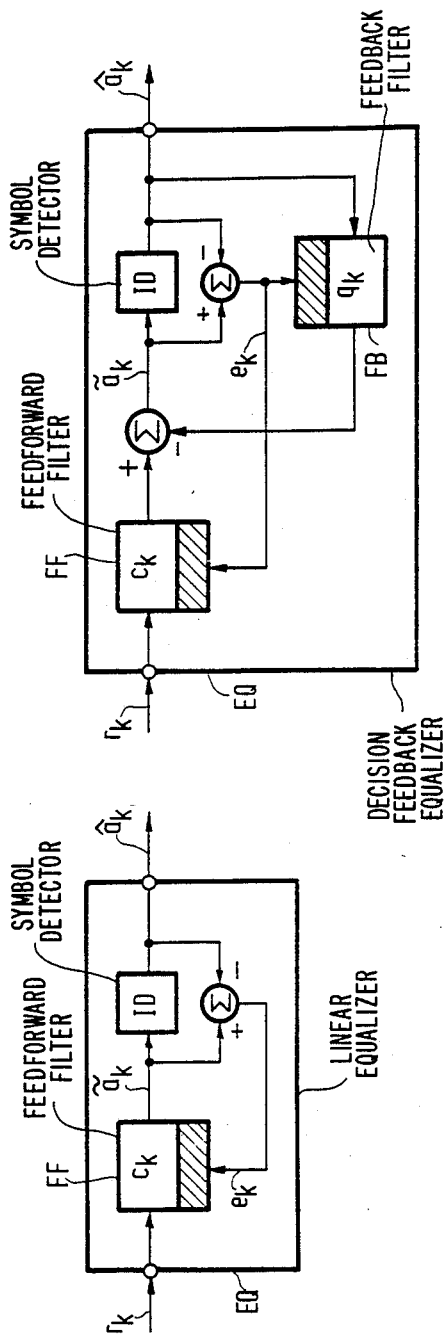
FIG.1
FIG.2A
FIG.2B

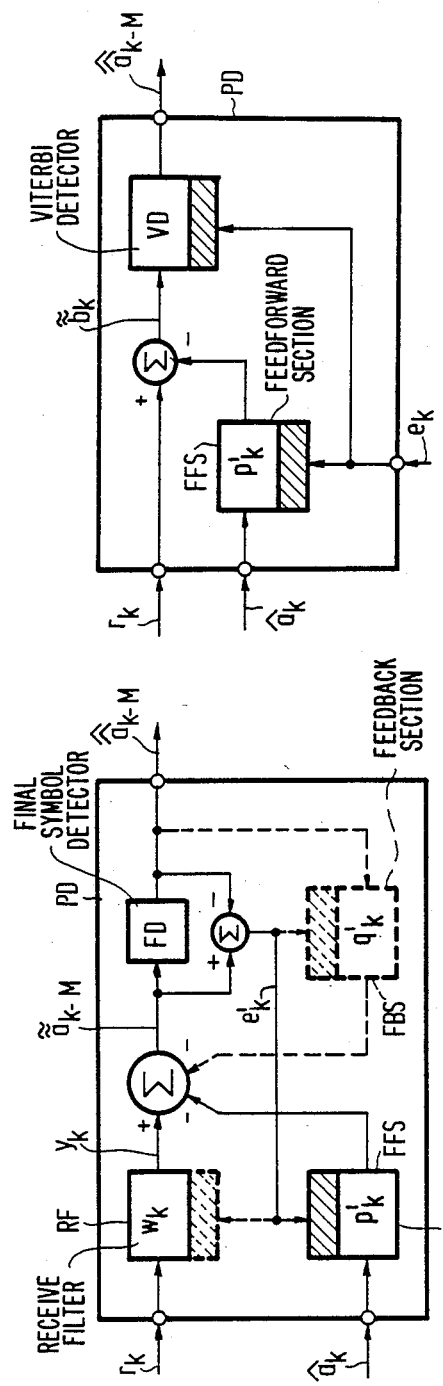
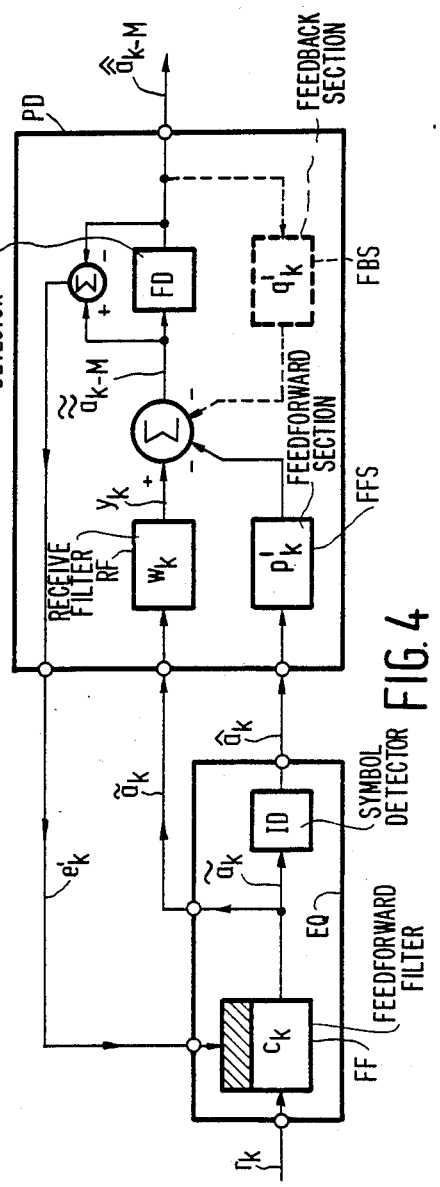

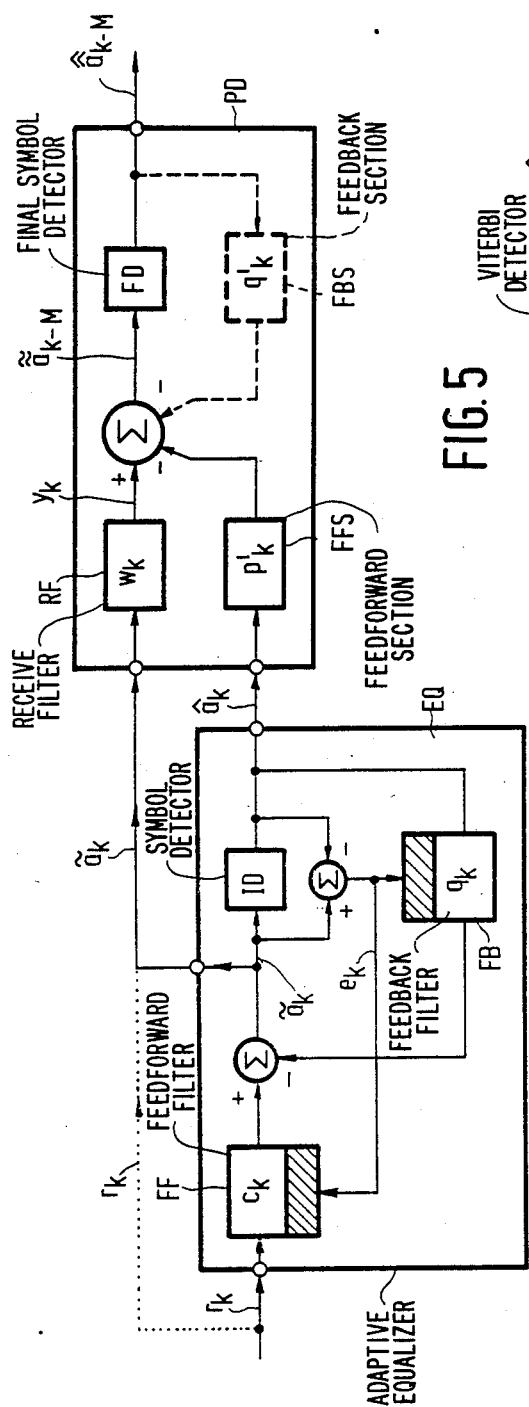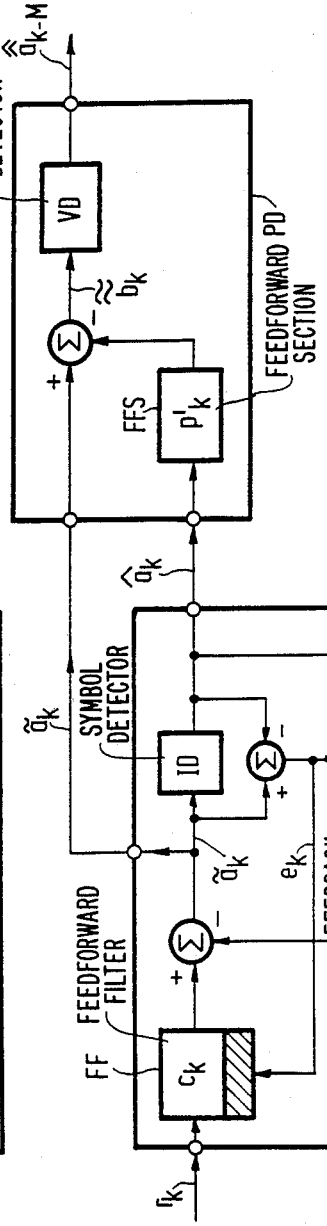
FIG. 5
FIG. 7

ARRANGEMENT FOR COMBATING INTERSYMBOL INTERFERENCE AND NOISE

The invention relates to an arrangement for combating intersymbol interference and noise which are introduced into a data signal transmitted at a symbol rate 1/T by a dispersive transmission channel, said arrangement comprising an adaptive equalizer having a fixed symbol detector for forming tentative symbol decisions, as well as a post-detector for forming final symbol decisions from the tentative symbol decisions utilizing an auxiliary signal derived from the transmitted data signal at the input of the arrangement.

Such arrangements are known for the case in which the equalizer is a linear equalizer and for the case in which the equalizer is of the decision feedback type. The former option is described in an article "Adaptive Cancellation of Nonlinear Intersymbol Interference for Voiceband Data Transmission" by E. Biglieri et al., published in IEEE J. Select. Areas Commun., Vol. SAC-2, No. 5, pp. 765-777, September 1984, more specifically, FIG. 7 and the associated description, the latter option being known from an article "A Maximum-Likelihood Sequence Estimator with Decision-Feedback Equilization" by W. U. Lee and F. S. Hill Jr., published in IEEE Trans. Commun., Vol. COM-25, No. 9, pp. 971-979, September 1977, more specifically, FIG. 2 and the associated description. As already shown by the two titles, the post-detectors considered in these articles are of different types. More specifically, in the article by Biglieri et al. an intersymbol interference canceller is utilized, whereas in the article by Lee and Hill a post-detector is utilized which is arranged for estimating the maximum-likelihood sequence of transmitted data symbols. In both cases the post-detector comprises a final symbol detector for forming final symbol decisions on the basis of an input signal with a well defined correlation structure, and the transmitted data signal at the input of the arrangement constitutes the auxiliary signal which is utilized in the post-detector for improving the quality of the symbol decisions. For transmission channels whose transfer characteristics are not accurately known a priori, the correlation structure of this auxiliary signal is also uncertain. In such cases the post-detector should be arranged in an adaptive way so as to realize the predetermined correlation structure at the input of the final symbol detector.

The invention now has for its object to provide an arrangement of the type mentioned in the preamble in which a priori knowledge is used of the main character of the transfer characteristic of the transmission channel for simplifying the post-detector.

Thereto, the system according to the invention is characterized in that the post-detector is arranged for forming the final symbol decisions in a non-adaptive way and in that the auxiliary signal is constituted by the input signal of the symbol detector.

In contradistinction to the situation with the known arrangements, the correlation structure of this auxiliary signal is no longer uncertain because it is tailored to the fixed symbol detector owing to the adaptability of the equalizer. Consequently, the post-detector need no longer be arranged adaptively so that a simpler implementation is possible. The loss of transmission quality attending this simplification can be minimized, when dimensioning the post-detector, by taking account of a priori knowledge of the main character of the transfer characteristic of the transmission channel.

This general notion will now be discussed in more detail for a number of embodiments of the invention with reference to the drawing in which:

FIG. 1 shows a functional discrete-time model of a data transmission system having a dispersive transmission channel and an arrangement known from the above-mentioned prior art having an adaptive equalizer and an adaptive post-detector;

FIG. 2A and FIG. 2B show block diagrams of an adaptive linear equalizer and an adaptive equalizer of the decision feedback type, respectively;

FIG. 3A shows a block diagram of a known adaptive post-detector in the form of an intersymbol interference canceller, and FIG. 3B shows a block diagram of a known adaptive post-detector which is arranged for estimating the maximum-likelihood sequence of transmitted data symbols;

FIG. 4 shows a block diagram of an arrangement according to the invention having an adaptive linear equalizer and a non-adaptive post-detector in which intersymbol interference cancellation is used;

FIG. 5 shows a block diagram of an arrangement according to the invention having an adaptive decision feedback equalizer and a non-adaptive post-detector in which intersymbol interference cancellation is used;

FIG. 7 shows a block diagram of an arrangement according to the invention having an adaptive decision feedback equalizer and a non-adaptive post-detector which is arranged for estimating the maximum-likelihood sequence of transmitted data symbols.

In all these FIGS. corresponding elements are always indicated by the same reference symbols.

Figure 6A:
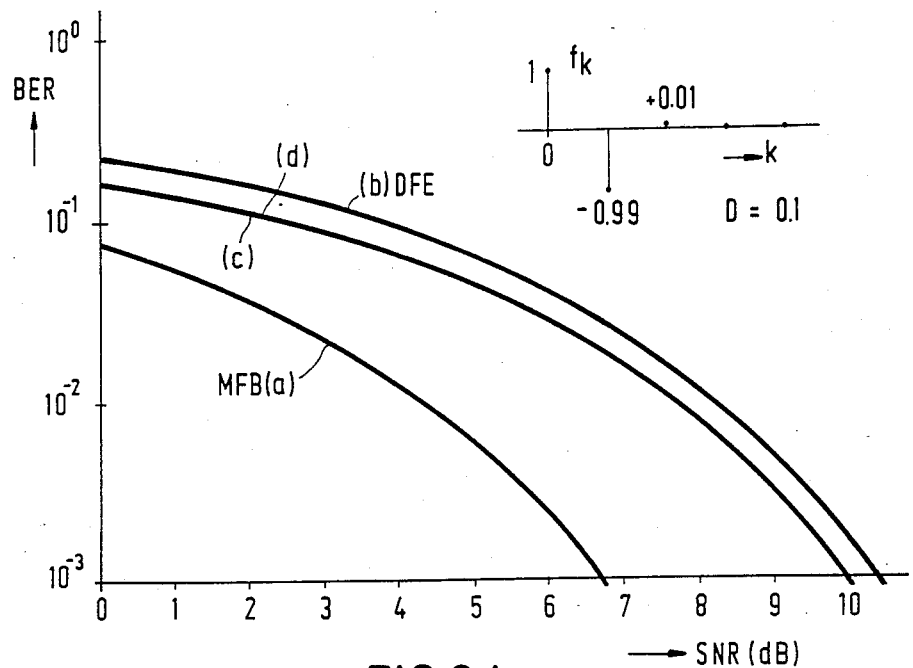
FIG. 6A and FIG. 6B show a set of graphs for illustrating the quality of tentative and final symbol decisions in the arrangement according to FIG. 5.

In the following description a discrete-time modelling of the transmission system and the arrangement is used, as the general notion of the invention can be presented in the most simple way with reference to such a modelling. This does not lead to a loss of generality as the present modelling can be derived unambiguously from the parameters of the continuous-time system, as described, for example, in the book entitled "Digital Communications", by J.G. Proakis, McGraw-Hill, New York, 1983, Chapter 6, and especially Section 6.3, pp. 351-357.

FIG. 1 shows a functional discrete-time model of a system for transmitting data symbols $a_k$ at a symbol rate 1/T through a discrete-time dispersive channel CH having a casual impulse response $f_k$, which channel introduces also additive white Gaussian noise so that a received data signal $$r_k = (a * f)_k + n_k \tag{1}$$

develops, the symbol "*" representing the linear convolution operator. This received data signal $r_k$ is applied to an adaptive equalizer EQ for obtaining tentative symbol decisions $b_k$ which, in the absence of transmission errors, are related in a simple and generally linear manner to the transmitted data symbols $a_k$ and from which tentative symbol decisions $â_k$ can be derived in a simple manner which, in the absence of transmission errors, are equal to $a_k$. When using partial-response techniques this correlation can be described with the aid of a polynomial in a delay operator D representing the symbol interval T. Further details about these partial-response polynomials are to be found, for example, in the article "Partial-Response Signaling" by P. Kabal and S. Pasupathy, IEEE Trans. Commun., Vol. COM-23, No. 9, pp. 921-934, September 1975. Besides, a patent application (PHN 12.037) filed simultaneously with the present Application provides a detailed description of the use of partial-response techniques for the case in which the equalizer EQ is of the decision feedback type. In all these cases it is possible to obtain at the output of the equalizer EQ a signal $\hat{a}_k$ which, in absence of transmission errors, is a faithful replica of the transmitted data signal $a_k$. It may well be the case that specific operations which are carried out in the equalizer EQ to derive $\hat{a}_k$ from $\tilde{b}_k$ are again cancelled in a subsequent adaptive post-detector PD. Naturally, in such cases it is wiser in a practical implementation to apply to the post-detector PD such a signal that strictly speaking no redundant operations need to be carried out. For simplicity, it will be assumed hereinafter that the equalizer EQ generates tentative symbol decisions $\hat{a}_k$ which, in the absence of transmission errors, are a faithful replica of the transmitted data symbols $a_k$, so that $$\tilde{b}_k = \hat{a}_k \quad (2)$$

for all k. On the basis of the above considerations it will be evident that this assumption does not impose essential constraints.

The tentative symbol decisions $\hat{a}_k$ at the output of equalizer EQ are applied to the adaptive post-detector PD, which derives additional information from an auxiliary signal in the form of the received signal $r_k$ and uses this additional information for improving the quality of the tentative symbol decisions $\hat{a}_k$. The final symbol decisions $\hat{\hat{a}}_{k-M}$ thus obtained are ideally a version of the transmitted data symbols $a_k$ delayed over a specific number of M symbol intervals having length T.

Generally, the adaptive equalizer EQ can be arranged in any way conventionally used for forming final symbol decisions. More specifically, the equalizer EQ can be a linear or a decision-feedback equalizer, as shown in the FIGS. 2A and 2B, respectively.

The linear equalizer as shown in FIG. 2A comprises an adaptive feedforward filter FF with an impulse response $c_k$ which converts received data signal $r_k$ into a real-valued estimate $\tilde{a}_k$ of transmitted data signal $a_k$. From this estimate $\tilde{a}_k$ a symbol detector ID subsequently forms tentative symbol decisions $\hat{a}_k$. On the basis of formula (1) input signal $\tilde{a}_k$ can be written as $$\tilde{a}_k = (r * c)_k = (a * f * c)_k + (n * c)_k. \quad (3)$$

As impulse response $c_k$ of feedforward filter FF is adjusted adaptively for suppressing intersymbol interference (ISI) in the data component $(a * f)_k$ of received data signal $r_k$ according to formula (1), the data component $(a * f * c)_k$ of input signal $\tilde{a}_k$ should be substantially free from ISI. Therefore, impulse response $c_k$, apart from an otherwise unimportant scale factor, will satisfy as a good approximation:

$$(f * c)_k = \delta_k \quad (4)$$

where $\delta_k$ is the Kronecker delta function with $$\delta_k = \begin{cases} 1, & k = 0 \\ 0, & k \neq 0. \end{cases} \quad (5)$$

When utilizing formulas (4) and (5), formula (3) can then be simplified to $$\tilde{a}_k = a_k + (n * c)_k \quad (6)$$

so that at the input of symbol detector ID an estimate $\tilde{a}_k$ of data signal $a_k$ is formed which is practically free from ISI. The filtered noise signal $(n * c)_k$ which occurs in this expression will generally be an amplified and correlated version of the original noise signal $n_k$, because feedforward filter FF, in addition to an optional phase equalization, normally also performs an amplitude equalization which results in noise components being additionally amplified at frequencies at which transmission channel CH shows a large attenuation.

For completeness, it is observed that the assumption made here that at the input of symbol detector ID a direct estimate $\tilde{a}_k$ of $a_k$ is formed, leads to a correlation structure of $\tilde{a}_k$ at the input of symbol detector ID which substantially corresponds with the generally well-defined correlation structure of $a_k$. Conversely, with the use of partial-response techniques, not discussed in more detail in this Application, a linearly transformed version $b_k$ of $a_k$ is estimated, which leads to an equally well-defined correlation structure of this estimate $\tilde{b}_k$ of $b_k$ at the input of symbol detector ID.

As appears from the above, a correct adjustment of feedforward filter FF always leads to a correlation structure of input signal $\tilde{a}_k$ which is required for the proper functioning of symbol detector ID. An adjustment of feedforward filter FF adapted to this desirable correlation structure is achieved under control of an error signal $e_k$ which in the case of FIG. 2A is representative of the difference between the input signal $\tilde{a}_k$ and output signal $\hat{a}_k$ of symbol detector ID. For simplicity, it is assumed in FIG. 2A that error signal $e_k$ is equal to the difference signal $\tilde{a}_k - \hat{a}_k$.

The decision-feedback equalizer EQ shown in FIG. 2B includes in addition to the elements of FIG. 2A also a feedback filter FB having an impulse response $q_k$ which generates a cancelling signal for post-cursive ISI on the basis of tentative symbol decisions $\hat{a}_k - i$ with $i \geq 1$, which decisions have already been made, this cancelling signal being subtracted by means of a summator from the output signal of feedforward filter FF for obtaining the input signal $\tilde{a}_k$ of symbol detector ID. Error signal $e_k$, which is representative of the difference between in and output signals $\tilde{a}_k$ and $\hat{a}_k$ of symbol detector ID, is again used for obtaining the desired correlation structure of input signal $\tilde{a}_k$ of symbol detector ID. Thereto, it is necessary that at least one of the two filters FF and FB be adjusted adaptively under control of error signal $e_k$.

On the basis of formula (1) input signal $\tilde{a}_k$ of symbol detector ID in FIG. 2B can be written as $$\tilde{a}_k = (r * c)_k - (\hat{a} * q)_k = (a * f * c)_k - (\hat{a} * q)_k + (n * c)_k \quad (7)$$

With a correct dimensioning of feedforward filter FF the data component $(a * f * c)_k$ of its output signal will virtually only contain post-cursive ISI, so that in good approximation the following will hold $$(f * c)_k = 0, \quad k \leq -1. \tag{8}$$

For combating post-cursive ISI, feedback filter FB has a causal impulse response $q_k$ for which holds $$q_k = \begin{cases} 0, & k \leq 0 \\ (f * c)_k, & k \geq 1 \end{cases} \tag{9}$$

Due to this causal nature of feedback filter FB its output signal at any instant is only determined by the past tentative symbol decisions $\hat{a}_{k-i}$ with $i \geq 1$. Under normal operating conditions these symbol decisions are correct and in that case, when using formulas (8) and (9), formula (7) can in good approximation be written as $$\tilde{a}_k = a_k + (n * c)_k. \tag{10}$$

According to the latter formula, in the absence of erroneous tentative symbol decisions $\hat{a}_k$, an estimate $\tilde{a}_k$ of data signal $a_k$ that is practically free from post-cursive ISI is formed at the input of symbol detector ID. For transforming the impulse reponse $f_k$ of transmission channel CH into a substantially causal impulse response $(f * c)_k$ according to formula (8), feedforward filter FF substantially performs a phase equalization resulting in virtually no noise colouring or noise amplification. For simplicity of the next description, the effect of this equalization will be incorporated in impulse response $f_k$ of transmission channel CH, so that feedforward filter FF can be omitted. It will also be assumed that the gain factor of feedforward filter FF also incorporated in $f_k$ leads to a scaling of $f_k$ such that $f_o = 1$. These two assumptions, which do not have a limiting effect on the following considerations, enable to simplify formula (7) to $$\tilde{a}_k = (a * f)_k - (\hat{a} * q)_k + n_k \tag{11}$$

and formula (9) to $$q_k = f_k - \delta_k \tag{12}$$

so that formula (7) can now be written as $$\tilde{a} = (a * f)_k - (\hat{a} * (f - \delta))_k + n_k = \hat{a}_k + ((a - \hat{a}) * f)_k + n_k. \tag{13}$$

In the absence of erroneous tentative symbol decisions $\hat{a}_k$ the term $((a - \hat{a}) * f)_k$ in this expression is dropped, so that then the following holds $$\tilde{a}_k = a_k + n_k. \tag{14}$$

To illustrate the conventional way of structuring post-detector PD of FIG. 1, FIG. 3A shows a block diagram of a known adaptive post-detector in the form of an ISI canceller (compare the above article by Biglieri et al.), FIG. 3B showing a block diagram of a known adaptive post-detector which is arranged for estimating the maximum-likelihood sequence of transmitted data symbols (compare the above article by Lee and Hill).

The post-detector shown in FIG. 3A comprises a receive filter RF having impulse response $w_k$. From received data signal $r_k$ receive filter RF forms a filtered version $y_k$ in which noise is suppressed as well as possible. As known (compare the said article by Biglieri et al.), a maximum noise suppression is achieved by arranging receive filter RF as a so-called "Matched Filter" whose impulse reponse is the time-inverse of the impulse response $f_k$ of transmission channel CH. In order to realize a causal and hence physically implementable impulse response $w_k$ receive filter RF should also introduce a signal delay MT which corresponds with a number of M symbol intervals having length T and which is at least equal to the memory span of transmission channel CH, so that ideally for impulse response $w_k$ it holds that $$w_k = f_{M-k} = f_{-(k-M)}. \tag{15}$$

Post-detector PD also includes a final-symbol detector FD for forming the final symbol decisions $\hat{a}_{k-M}$, and means for cancelling ISI in output signal $y_k$ of receive filter RF. These cancelling means comprise a feedforward section FFS with a causal impulse response $p_k$ for forming a first cancelling signal for pre-cursive ISI in $y_k$ in response to a number of tentative symbol decisions $\hat{a}_k$, a feedback section FBS with a causal impulse response $q_k$ for forming a second cancelling signal for post-cursive ISI in $y_k$ in response to a number of final symbol decisions $\hat{a}_{k-M}$, and a summator for combining $y_k$ with the two cancelling signals into an output signal $\tilde{a}_{k-M}$ for final-symbol detector FD.

The feedforward and feedback sections FFS and FBS and possibly also the receive filter RF are adjusted adaptively under control of an error signal $e_k$ which is representative of the difference between signal $\tilde{a}_{k-M}$ and output signal $\hat{a}_{k-M}$ of final symbol detector FD. As appears from an article "On the Performance and Convergence of the Adaptive Canceller of Intersymbol Interference in Data Transmission" by K. Wesolowski, published in IEEE Trans. Commun., Vol. COM-33, No. 5, pp. 425-432, May 1985, with the aid of this post-detector an improvement of the transmission quality can often be achieved which corresponds with an improvement of 1-2 dB in the signal-to-noise ratio. As the correlation structure of received signal $r_k$ is not precisely known in advance, the same will apply to output signal $y_k$ of receive filter RF, irrespective of the adaptive or non-adaptive implementation of this receive filter RF. For the sake of the required accurate cancellation of pre- and post-cursive ISI it is therefore essential that the feedforward and feedback sections FFS and FBS have an adaptive structure.

On the basis of formula (1) output signal $y_k$ of receive filter RF in FIG. 3A can be described as $$y_k = (r * w)_k = (a * f * w)_k + (n * w)_k. \tag{16}$$

When utilizing a "Matched Filter" according to formula (15) for receive filter RF this expression can be rewritten as $$y_k = (a * (f * f_-))_{k-M} + (n * f_-)_{k-M} \tag{17}$$

in which the subscript "$-$" is used to indicate time-inversion, so that, for example, $(f * f_-)_k$ represents the autocorrelation function of impulse response $f_k$ of transmission channel CH. For input signal $$\tilde{a}_{k-M} = y_k - (\hat{a} * p')_k - (\hat{a} * q')_{k-M} \tag{18}$$

of final symbol detector FD it then holds that $$\tilde{a}_{k-M} = (\hat{a} * (f * f_-))_{k-M} - (\hat{a} * p')_k + -(\hat{a} * q')_{k-M} + (n * f_-)_{k-M}. \quad (19)$$

As appears from this formula, pre-cursive ISI in the data component $(a * (f * f_-))_{k-M}$ of $y_k$ can only be cancelled on the basis of the tentative symbol decisions $\hat{a}_k$ not delayed over M symbol intervals, and thus by means of the second term $(\hat{a} * p')_k$ on the right-hand side. Conversely, post-cursive ISI in the data component $(a * (f * f_-))_{k-M}$ of $y_k$ can be cancelled both on the basis of tentative symbol decisions $\hat{a}_k$ and on the basis of the qualitatively better final symbol decisions $\hat{\tilde{a}}_{k-M}$ (compare also the description of FIG. 1 in the above article by Wesolowski). With cancellation of pre-cursive and post-cursive ISI on the basis of tentative symbol decisions $\hat{a}_k$ feedback section FBS can be omitted, as is shown by a dashed line in FIG. 3A, and feedforward section FFS should have the following impulse response according to formula (19)

$$p_k = \begin{cases} 0, & k \le -1, \\ (f * f_-)_{k-M}, & 0 \le k \le M - 1, \\ 0, & k = M \\ (f * f_-)_{k-M}, & M + 1 \le k \le 2M - 1 \\ 0, & k \ge 2M - 1 \end{cases} \quad (20)$$

When cancelling post-cursive ISI by means of a feedback section FBS impulse responses $p_k$ and $q_k$ of the feedforward and feedback sections FFS and FBS should obviously satisfy $$p_{k'} = \begin{cases} 0, & k \le -1 \\ (f * f_-)_{k-M}, & 0 \le k \le M - 1, \\ 0, & k \ge M \end{cases} \quad (21)$$

and $$q_{k'} = \begin{cases} 0, & k \le 0 \\ (f * f_-)_k, & 1 \le k \le M - 1, \\ 0, & k \ge M. \end{cases} \quad (22)$$

Both in the case of formula (20) and the case of formulas (21) and (22) perfect cancellation of pre- and post-cursive ISI is effected in the absence of erroneous tentative and final symbol decisions, in which case formula (19) can be simplified to $$\tilde{a}_{k-M} = a_{k-M}(f * f_-)_0 + (n * f_-)_{k-M}. \quad (23)$$

According to this formula there is formed at the input of final-symbol detector FD an estimate $\tilde{a}_{k-M}$ of a version of data signal $a_{k-M}$ that is amplified by a factor $(f * f_-)_0$, in which estimate pre-cursive and post-cursive ISI is fully cancelled and noise is optimally suppressed because receive filter RF has an impulse reponse $w_k$ of the "Matched Filter" type with $w_k = f_{-(k-M)}$. As also appears from the above article by K. Wesolowski, this optimum noise suppression leads to a quality improvement of the final symbol decisions $\hat{\tilde{a}}_{k-M}$ with respect to that of the tentative symbol decisions $\hat{a}_k$ which corresponds with an improvement of 1–2 dB in the signal-to-noise ratio. It is worth mentioning that this improvement is not strictly bound to the use of a "Matched Filter" for receive filter RF, as appears, for example from an article "A Simulation Study of Intersymbol Interference Cancellation" by J. W. M. Bergmans and Y. C. Wong, published in AEU, Vol. 41, No. 1, pp. 33–37, 1987. More specifically, this article shows that especially deviations from the "Matched Filter" characteristic, leading to a smaller amount of pre-cursive ISI, will hardly lead to a loss of transmission quality, with the proviso that feedforward and feedback sections FFS and FBS are dimensioned such that there is perfect cancellation of pre-cursive and post-cursive ISI in the absence of erroneous tentative and final symbol decisions.

The post-detector PD shown in FIG. 3B comprises a feedforward section FFS with a causal impulse response $p_k$ for reducing the span of post-cursive ISI in auxiliary signal $r_k$ by means of a summator also receiving this auxiliary signal $r_k$. The output signal $\tilde{b}_k$ of this summator is applied to a Viterbi detector VD, which determines on the basis of $\tilde{b}_k$ the maximum-likelihood sequence $\hat{\tilde{a}}_{k-M}$ of transmitted data symbols $a_k$. Owing to the reduced span of the ISI in input signal $\tilde{b}_k$ a relatively simple Viterbi detector VD will suffice. As also the remaining ISI in input signal $\tilde{b}_k$ of Viterbi detector VD has a correlation structure which is not accurately known in advance, both the feedforward section FFS and the Viterbi detector VD will have to be adjusted adaptively under control of, for example, the error signal $e_k$ from the FIGS. 2A and 2B.

According to FIG. 3B input signal $\tilde{b}_k$ of Viterbi detector VD can be written as $$\tilde{b}_k = r_k - (\hat{a} * p')_k. \quad (24)$$

When using formula (1) this formula can be written as $$\tilde{b}_k = (a * f)_k - (\hat{a} * p')_k + n_k. \quad (25)$$

The reduction of the span of the ISI in auxiliary signal $r_k$ which is produced by the second term in the right-hand side of this formula can be explained in a simple way by splitting up the impulse response $f_k$ of transmission channel CH according to $$f_k = f_k^t + f_k^r \quad (26)$$

where $$f_k^t = \begin{cases} f_k, & 0 \le k \le L, \\ 0, & k \ge L + 1 \end{cases} \quad (27)$$

and $$f_k^r = \begin{cases} 0, & 0 \le k \le L, \\ f_k, & k \ge L + 1 \end{cases} \quad (28)$$

According to these formulas $f_k$ is split up into a truncated impulse response $f^t_k$ with a suitably chosen and generally small memory span LT, and a residual impulse response $f^r_k$. Now it is a task of the feedforward section FFS to cancel the ISI within the span of the residual impulse response $f^r_k$. Thereto, impulse response $p_k$ of feedforward section FFS is chosen such that $$p_k = f^r_k. \quad (29)$$

When using formulas (26) and (29) formula (25) can be written as $$\bar{\tilde{b}}_k = (a * f)_k + ((a - \hat{a}) * f)_k + n_k. \quad (30)$$

In the absence of erroneous tentative symbol decisions $\hat{a}_k$ the term $((a-\hat{a}) * f)_k$ in this expression is dropped, so that the following holds $$\bar{\tilde{b}}_k = (a * f)_k + n_k. \quad (31)$$

which implies on the basis of formula (27) that $\bar{\tilde{b}}_k$ only contains ISI in a reduced span with the length LT, so that a relatively simple Viterbi detector VD will suffice.

In situations in which a priori knowledge about the main character of the transfer characteristic of transmission channel CH is available, the invention now provides a possibility of arranging post-detector PD in a non-adaptive and thus simpler way. The loss of transmission quality attending this simplification remains slight as will be explained hereinafter.

FIG. 4 shows a block diagram of an arrangement according to the invention with an adaptive linear equalizer EQ according to FIG. 2A and a non-adaptive post-detector PD based on the principle of ISI cancellation as also applied in FIG. 3A. In contradistinction to the situation in FIG. 1 the auxiliary signal of post-detector PD is not formed now by received data signal $r_k$, but by input signal $\tilde{a}_k$ of symbol detector ID in equalizer EQ of FIG. 4. This signal has a well-defined correlation structure which according to formula (6) is substantially given by the fixed correlation structure of data signal $a_k$. This also holds for the tentative symbol decisions $\hat{a}_k$ and, therefore, a non-adaptive embodiment of post-detector PD will suffice. A proper dimensioning in this respect is to be achieved by using a priori knowledge about the main character of the transfer characteristic of transmission channel CH. This a priori knowledge can be simply represented in terms of a nominal impulse response $g_k$ of transmission channel CH, known in advance, which response is causal as is the actual response $f_k$, and which is related to $f_k$ according to $$f_k = g_k + \Delta_k \quad (32)$$

where $\Delta_k$ represents the relatively small difference between the nominal and the actual impulse responses.

According to formula (6), input signal $\tilde{a}_k$ of symbol detector ID in the present case contains a noise component $(n * c)_k$ amplified by feedforward filter FF. Receive filter RF, as in the conventional combination of FIG. 2A with FIG. 3A, now has to realize as good a suppression of this noise component as possible. If accurate a priori knowledge with respect to impulse response $f_k$ of transmission channel CH were available, a maximum noise suppression could be realized by dimensioning receive filter RF such that its output signal $y_k$ has the same noise component $(n * f_-)_{k-M}$ as in the conventional situation described by formula (17). Because in FIG. 4 it holds that $$y_k = (\tilde{a} * w)_k \quad (33)$$

this means that according to formula (6) impulse response $w_k$ of receive filter RF should satisfy $$(c * w)_k = f_{-(k-M)}. \quad (34)$$

Owing to the adaptability of equalizer EQ impulse response $c_k$ satisfies formula (4), so that formula (34) after convolution with $f_k$ can be simplified to $$w_k = (f * f_-)_{k-M} \quad (35)$$

Therefore, impulse response $w_k$ of receive filter RF in this case should ideally be a delayed version of autocorrelation function $(f * f_-)_k$ of impulse response $f_k$ of transmission channel CH.

Because knowledge of the precise form of $f_k$ is lacking, receive filter RF can now only be dimensioned in accordance with the nominal impulse response $g_k$ of transmission channel CH, so that $$w_k = (g * g_-)_{k-M}. \quad (36)$$

The noise suppression achieved by this choice is substantially equal to the noise suppression achieved in the case of the conventional adaptive equalisation, considering the relatively small difference $\Delta_k$ between the nominal and actual impulse responses $g_k$ and $f_k$. With the aid of formulas (6) and (33) it appears that in this case an output signal $y_k$ of receive filter RF develops having the form $$y_k = (a * (g * g_-))_{k-M} + (n * c * (g * g_-))_{k-M}. \quad (37)$$

This formula distinctly shows that the fixed correlation structure of input signal $\tilde{a}_k$ of symbol detector ID in combination with the non-adaptive form of receive filter RF leads to a fixed correlation structure of data component $(a * (g * g_-))_{k-M}$ of output signal $y_k$ of receive filter RF. Consequently, it is possible to cancel pre-cursive and post-cursive ISI in this output signal $y_k$ on the basis of non-adaptive feedforward and feedback sections FFS and FBS. Thus, a post-detector PD which is totally non-adaptive and hence simpler to implement will suffice. The achieved simplification of the implementation of post-detector PD is linked with only a minor impairment of the transmission quality as the noise suppression realized by the receive filter RF still substantially corresponds with the noise suppression in the adaptive situation.

In FIG. 4 post-detector PD is also arranged for producing an error signal $e_k$ which is representative of the difference between input signal $\tilde{a}_{k-M}$ and output signal $\hat{a}_{k-M}$ of final symbol detector FD. This signal $e_k$ is used for adjusting the adaptive filter FF in equalizer EQ of FIG. 4 in lieu of the qualitatively poorer error signal $e_k$ from FIG. 2A.

In practice there will be a certain freedom with respect to the exact choice of the nominal impulse response $g_k$ of transmission channel CH. This freedom can be used for a further simplification of post-detector PD, as will now be explained for the case in which this impulse response $g_k$ can be characterized by a partial-response polynomial g(D). For, according to the above article by Kabal and Pasupathy, such a polynominal g(D) in the delay operator D generally has a relatively low order and also, apart from an otherwise unimportant scale factor, only integral-valued coefficients. Consequently, the impulse response $w_k$ of receive filter RF, according to formula (36) being a delayed version of the autocorrelation function of impulse response $g_k$, will have only a small number of non-zero coefficients which, in addition, are integral. Needless to observe that this will lead to an extremely simple digital implementation. An additional advantage of such a choice is the fact that the small order of a partial-response polynomial in many cases will lead to an output signal $y_k$ of receive filter RF with less pre-cursive ISI than when a "Matched Filter" is used. As appears from the above article by Bergmans and Wong this generally leads to a transmission quality which is hardly inferior to the quality when a "Matched Filter" is used.

To illustrate this possibility of further simplification of post-detector PD it is observed that the impulse response $f_k$ of a much used class of digital magnetic recording systems at low information densities is characterized in good approximation by the simple bipolar polynomial $$g(D) = 1 - D \tag{38}$$

as shown in an article "Discrete-Time Models for Digital Magnetic Recording" by J. W. M. Bergmans, Philips J. Res., Vol. 41, No. 6, pp. 531–558, 1986. According to formula (36) it then holds that with $M = 1$ $$w_k = \begin{cases} -1, & k = 0, \\ 2, & k = 1, \\ -1, & k = 2, \\ 0, & k \geq 3, \end{cases} \tag{39}$$

so that receive filter RF can be implemented digitally in an utterly simple manner.

Since the ISI in output signal $y_k$ of receive filter RF according to formula (33) is completely determined by impulse response $w_k$ of receive filter RF, which in the present example is given by formula (39), the dimensioning of feedforward and feedback sections FFS and FBS for cancelling pre-cursive and post-cursive ISI will be completely determined by this impulse response $w_k$, and in this example for the respective impulse responses $p_k$ and $q_k$ of these two sections it will hold that $$p_k' = \begin{cases} -1, & k = 0 \\ 0, & k \geq 1, \end{cases} \tag{40}$$

and $$q_k' = \begin{cases} 0, & k = 0 \\ -1, & k = 1 \\ 0, & k \geq 2. \end{cases} \tag{41}$$

So, in combination with the sign inversion to be performed in the summator, feedforward section FFS degenerates to a direct through-connection, whilst feedback section FBS degenerates to an extremely simple delay over one symbol interval T.

Such simplifications as shown in FIG. 4 are also possible in the case when equalizer EQ in the arrangement according to the invention is of the decision feedback type. This will now be further explained with reference to FIG. 5 differing from FIG. 4 in that now decision feedback equalizer EQ according to FIG. 2B is used.

In FIG. 5 adaptive equalizer EQ forms estimates $\tilde{a}_k$ of data signal $a_k$ which are given by formula (13), which formula under normal operating conditions can be simplified to formula (14).

In the conventional arrangement corresponding with FIG. 5, in which the auxiliary signal for post-detector PD is constituted by received data signal $r_k$ (as is shown by a dashed line in FIG. 5), receive filter RF should be matched in the best way possible to impulse response $f_k$ of transmission channel CH, compare formula (15), for the benefit of a maximum noise suppression. In the novel configuration of FIG. 5 input signal $\tilde{a}_k$ of symbol detector ID in lieu of received data signal $r_k$ is used as an auxiliary signal for post-detector PD. Since $\tilde{a}_k$ contains the same noise component $n_k$ as received data signal $r_k$, receive filter RF should again be a "Matched Filter" according to formula (15) for a maximum suppression of this noise component $n_k$. Since actual knowledge about $f_k$ in post-detector PD is lacking, receive filter RF can now only be matched to the nominal impulse response $g_k$ of transmission channel CH, so that in this case $$w_k = g_{M-k} = g_{-(k-M)}. \tag{42}$$

The noise suppression achieved in this way is substantially the same as achieved with the conventional adaptive noise suppression.

For completeness it should be observed that in the conventional adaptive configuration according to FIG. 3B it is also possible and advisable for reasons of complexity to use a non-adaptively approximated "Matched Filter" according to formula (42). In those cases in which actual impulse response $f_k$ of transmission channel CH is not equal to nominal impulse response $g_k$, this will lead to a data component $(a * f * g_-)_{k-M}$ in output signal $y_k$ of receive filter RF which is not strictly equal to the original data component $(a * f * f_-)_{k-M}$ according to formula (17). When utilizing feedforward section FFS for cancelling pre-cursive and post-cursive ISI, its impulse reponse $p_k$ will have to be adapted to this modified ISI structure according to $$p_k' = \begin{cases} 0, & k \leq -1, \\ (f * g_-)_{k-M}, & 0 \leq k \leq M - 1, \\ 0, & k = M \\ (f * g_-)_{k-M}, & M + 1 \leq k \leq 2M - 1 \\ 0, & k \geq 2M - 1, \end{cases} \tag{43}$$

which formula in the nominal case (that is to say, if $g_k = f_k$) is naturally the same as the original formula (20). In this case of a non-adaptive receive filter RF according to formula (42) thus an input signal $\tilde{a}_{k-M}$ of final symbol detector FD of the form $$\tilde{a}_{k-M} = (a * (f * g_-))_{k-M} - (\hat{a} * p')_k + + (n * g_-)_{k-M} \tag{44}$$

will develop.

When using formula (11) output signal $y_k = (\tilde{a} * w)_k$ of receive filter RF in the new situation of FIG. 5 can be written as $$y_k = (a * f * w)_k - (\hat{a} * q * w)_k + (n * w)_k \tag{45}$$

A comparison of this formula with the corresponding formula (16) for the conventional adaptive situation teaches us that this output signal $y_k$ now has an additional contribution $-(\hat{a} * q * w)_k$ in the form of tentative symbol decisions $\hat{a}_k$ which are filtered by feedback filter FB in equalizer EQ and, subsequently, by receive filter RF in post-detector PD. In order to obtain an input signal $\hat{a}_{k-M}$ of final symbol detector FD which is equal to the original input signal according to formula (44), this additional contribution $-(\hat{a}*q*w)_k$ will have to be removed by cancelling same with an equally large additional contribution via feedforward section FFS. Thereto, a contribution $(q*w)_k$ has to be added to the original impulse response $p_k$ of feedforward section FFS. When cancelling pre-cursive as well as post-cursive ISI on the basis of tentative symbol decisions $\hat{a}_k$, the original impulse response $p_k$ being provided by formula (43) owing to the use of an approximated "Matched Filter", it will now hold, therefore, that $$p_k' = \begin{cases} 0, & k \leq -1, \\ (f*g_-)_{k-M} - (q*w)_k, & 0 \leq k \leq M-1, \\ -(q*w)_M, & k = M, \\ (f*g_-)_{k-M} - (q*w)_k, & M+1 \leq k \leq 2M-1, \\ 0, & k \geq 2M-1. \end{cases} \quad (46)$$

According to formulas (12) and (42) it now holds that $$(q*w)_k = (f*g_-)_{k-M} - g_{-(k-M)} \quad (47)$$

so that formula (46) can be simplified to $$p_k' = \begin{cases} 0, & k \leq -1, \\ g_{-(k-M)}, & 0 \leq k \leq M-1, \\ g_0 - (f*g_-)_0, & k = M, \\ 0, & k \geq M+1, \end{cases} \quad (48)$$

in which for $k \geq M+1$ the a priori knowledge is used that $g_k$ is a causal function. According to this formula feedforward section FFS apparently does not need to cancel post-cursive ISI any longer because this cancellation has already been effected in an adaptive way by the cascade arrangement of adaptive feedback filter FB in equalizer EQ and non-adaptive receive filter RF in post-detector PD on the basis of tentative symbol decisions $\hat{a}_k$. It is evident that this will render the implementation of feedforward section FFS simpler. From formula (48) it appears that $p_k$ only for $k=M$ depends on the actual impulse response $f_k$ of transmission channel CH, which response is not known a priori. Naturally, the best possible, non-adaptive choice for this value $p_M$ is made by substituting the nominal impulse response $g_k$ for $f_k$, so that $$p_M = g_0 - (g*g_-)_0 \quad (49)$$

To illustrate the dimensioning thus required of feedforward section FFS, the following table summarizes the impulse responses $p_k$ of feedforward section FFS that are required when different partial-response polynomials g(D) are used for characterizing nominal impulse response $g_k$ of transmission channel CH.

| g(D) | p0' | p1' | p2' |
|------|-----|-----|-----|
| 1 − D | −1 | −1 | 0 |
| 1 + D | 1 | −1 | 0 |
| 1 − D² | −1 | 0 | −1 |
| (1 + D)² | 1 | 2 | −5 |

With the exception of the response $g(D)=(1+D)^2$ (less important in practice) all coefficients $p_k$ have an absolute value 0 or 1, leading to a highly simplified digital implementation of feedforward section FFS.

As already mentioned hereinbefore, it is basically possible in the conventional adaptive post-detector PD to cancel post-cursive ISI on the basis of qualitatively better final symbol decisions $\hat{a}_{k-M}$ by means of a feedback section FBS. It is clear that the just described procedure for determining an appropriate non-adaptive dimensioning of feedforward section FFS can also be implemented in this case for both feedforward section FFS and feedback section FBS of post-detector PD. For brevity, this procedure will not be repeated here, but it will suffice to present the table arranged for this situation.

| g(D) | p0' | p1' | p2' | p3' | p4' | q1' | q2' |
|------|-----|-----|-----|-----|-----|-----|-----|
| 1 − D | −1 | −1 | 1 | 0 | 0 | −1 | 0 |
| 1 + D | 1 | −1 | −1 | 0 | 0 | 1 | 0 |
| 1 − D² | −1 | 0 | −1 | 0 | 1 | 0 | −1 |
| (1 + D)² | 1 | 2 | −5 | −4 | −1 | 4 | 1 |

The strongly quantized and ever still relatively short impulse responses in this table are easy to realize in practice even at high symbol rates 1/T.

Figure 6B:
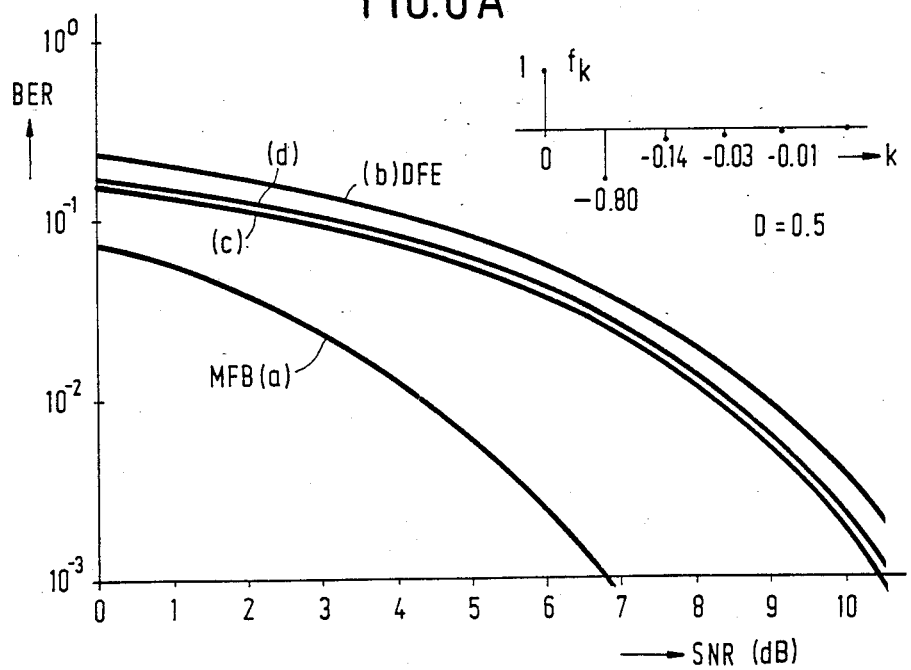

To illustrate the transmission quality that is achievable with the arrangement according to FIG. 5, FIG. 6 shows a set of graphs obtained by simulation, and that for a pair of digital magnetic recording systems of the type described in the above article by Bergmans, which systems have different normalized information densities D. These graphs show the probability of erroneous symbol decisions, in this case the bit error rate (BER), as a function of the signal-to-noise ratio (SNR) at the input of the arrangement. In both cases a partial-response polynomial $g(D)=1-D$ is used to characterize the nominal impulse response $g_k$ of transmission channel CH. For a very low normalized information density D=0.1 the actual impulse response $f_k$ as shown in FIG. 6A is substantially equal to nominal impulse response $g_k=\delta_k-\delta_{k-1}$. For a five times higher density D=0.5, however, the actual impulse response $f_k$ as shown in FIG. 6B already starts deviating from the nominal impulse response $g_k=\delta_k-\delta_{k-1}$, although $g_k$ still forms a reasonable styling of $f_k$. Curve (a) in FIG. 6A and FIG. 6B shows the theoretical optimum that is achievable with a detector arranged for estimating the maximum-likelihood sequence of transmitted data symbols $a_k$, which optimum in this case coincides with the so-called "Matched Filter Bound" (MFB). Curve (b) in FIGS. 6A and 6B shows the bit error rate (BER) for the tentative symbol decisions $\hat{a}_k$ at the output of equalizer EQ in FIG. 5. Curve (c) in FIG. 6A and FIG. 6B shows the bit error rate (BER) for the final symbol decisions $\hat{a}_{k-M}$ when using a conventional arrangement according to FIG. 1 with an adaptive equalizer EQ as shown in FIG. 2B and an adaptive post-detector PD as shown in FIG. 3A. Finally, curve (d) in FIG. 6A and FIG. 6B shows the bit error rate (BER) for the final symbol decisions $\hat{a}_{k-M}$ at the output of post-detector PD as shown in FIG. 5.

Because the actual and nominal impulse responses $f_k$ and $g_k$ in FIG. 6A are virtually identical, the dimensionings of non-adaptive post-detector PD in FIG. 5 and adaptive post-detector PD as shown in FIG. 3A will be the same in this case, as explained hereinbefore. Therefore, the curves (c) and (d) in this Figure coincide.

Comparing curves (c) and (d) on the one hand with curve (b) on the other shows that the quality of the final symbol decisions $a_{k-M}$ in this case is distinctly better than that of the tentative symbol decisions $â_k$. FIG. 6A finally shows that the curves (c) and (d) naturally fall short of the "Method Filter Bound" of curve (a).

In the situation of FIG. 6B nominal impulse response $g_k=\delta_k-\delta_{k-1}$ forms no more than a reasonable styling of actual impulse response $f_k$. The transmission quality which is achievable with a non-adaptive post-detector PD as shown in FIG. 5 (curve (d)) adjusted to nominal impulse response $g_k$ will naturally fall short of that of a fully adaptive post-detector PD as shown in FIG. 3A (curve (c)), which for that matter is fully adapted to the precise form of actual impulse response $f_k$. Nevertheless, as explained hereinbefore, the differences between curves (c) and (d) remain relatively small. Like in the situation of FIG. 6A the quality of the final symbol decisions $â_{k-M}$ according to both curve (c) and curve (d) is distinctly better than that of the tentative symbol decisions $â_k$ at the output of equalizer EQ (curve (b)). Needless to observe that the two curves (c) and (d) for their part again fall short of the "Matched Filter Bound" of curve (a).

A further increase of the information density D leads to an actual impulse response $f_k$ deviating ever more from the nominal impulse response $g_k=\delta_k-\delta_{k-1}$. From a certain density D the nominal impulse response $g_k$ will form such a little realistic styling of $f_k$ that the quality of the final symbol decisions $â_{k-M}$ of post-detector PD in FIG. 5 is not better, but even worse than that of the tentative symbol decisions $â_k$. Simulations have shown that this is the case for densities D from approximately D=1.2, for which holds $$f_0 = 1, \quad f_1 = -0.33, f_2 = -0.39, f_3 = -0.15, \qquad (50)$$
$$f_4 = -0.06, \quad f_5 = -0.03, f_6 = -0.02, f_7 = -0.01$$

so that the styling $g_0=1$, $g_1=-1$ is clearly unrealistic.

Also in the case when post-detector PD is arranged for estimating the maximum-likelihood sequence of transmitted data symbols a priori knowledge of the main character of the transfer characteristic of transmission channel CH can be used for designing post-detector PD in a non-adaptive and thus simpler way. This will now be further explained with reference to FIG. 7 showing a block diagram of an arrangement according to the invention with a decision feedback equalizer EQ as shown in FIG. 2B an a non-adaptive post-detector PD which is arranged for estimating the maximum-likelihood sequence of transmitted data symbols.

In FIG. 7 adaptive equalizer EQ forms estimates $ā_k$ of data signal $a_k$ which are given by formula (13), which formula under normal operating conditions can be simplified to formula (14).

In the conventional arrangement corresponding with FIG. 7, in which the auxiliary signal for post-detector PD is constituted by received data signal $r_k$ (compare FIG. 3B), feedforward section FFS should have an impulse response $p_k$ which corresponds in the best way possible with residual impulse response $f^r_k$ of transmission channel CH, compare formulas (28) and (29), in order to reduce the span of post-cursive ISI in input signal $b_k$ of Viterbi detector VD to the memory span LT of truncated impulse response $f^t_k$ of transmission channel CH, compare formulas (27), (30) and (31). In the novel configuration of FIG. 7, input signal $ā_k$ of symbol detector ID in equalizer EQ is used in lieu of received data signal $r_k$ as an auxiliary signal for post-detector PD. Compared to $r_k$ this auxiliary signal has an additional contribution $-(â*q)_k=-(â*(f-\delta))_k$ in the form of tentative symbol decisions $â_k$ which are filtered by feedback filter FB in equalizer EQ. In order to obtain an input signal $\tilde{b}_k$ of Viterbi detector VD which is identical with the original input signal according to formula (30), this additional contribution $-(â*(f-\delta))_k$ will have to be removed by cancelling same by an equally large additional contribution via feedforward section FFS. This means that in case of original impulse response $p_k=f^r_k$ a contribution $(\delta-f)_k$ will have to be added. The new impulse response $p_k$ then becomes $$p_k=f^r_k+\delta_k-f_k \qquad (51)$$

which expression, when using formula (26), can be simplified to $$p_k=\delta_k-f^t_k. \qquad (52)$$

Since a priori knowledge of the precise form of $f_k$ and thus also $f^t_k$ is lacking, feedforward section FFS can now only be dimensioned in accordance with the nominal impulse response $g_k$ of transmission channel CH, so that $$p_k=\delta_k-g^t_k \qquad (53)$$

where $g^t_k$ is the truncated version of the nominal impulse response $g_k$, that is to say, $$g_k^t = \begin{cases} g_k, & 0 \leq k \leq L, \\ 0, & k \geq L+1. \end{cases} \qquad (54)$$

On the basis of this formula and formula (14) it now appears that in the absence of erroneous tentative symbol decisions $â_k$ an input signal $\tilde{b}_k$ of Viterbi detector VD in post-detector PD will occur that has the form $$\begin{aligned}\tilde{b}_k &= a_k + n_k - (a*(\delta-g^t))_k \\ &= (a*g^t)_k + n_k.\end{aligned} \qquad (55)$$

This formula clearly shows that the fixed correlation structure of input signal $a_k$ of symbol detector ID in combination with the non-adaptive form of feedforward section FFS leads to a fixed correlation structure of data component $(a*g^t)_k$ of input signal $\tilde{b}_k$ of Viterbi detector VD. Therefore, once again a post-detector PD which is completely non-adaptive and hence simpler to implement will suffice. Like in the preceding cases, the achieved simplification of the implementation of post-detector PD is accompanied with only a slight impairment of the transmission quality considering the relatively small deviation between the nominal and actual truncated impulse responses $g^t_k$ and $f^t_k$. In the nominal case, that is to say, if $f^t_k=g^t_k$, non-adaptive post-detector PD according to FIG. 7 is even totally equivalent to conventional adaptive post-detector PD as shown in FIG. 3B.

When using the partial-response polynomial g(D) for characterizing the nominal truncated impulse response $g^t_k$ an input signal $\tilde{b}_k$ of Viterbi detector VD in post-detector PD will occur that has an extremely simple correlation structure. In that case it is possible to use a simpler final symbol detector in lieu of Viterbi detector VD for forming final symbol decisions $a_{k-M}$. Such detectors are known, for example, from an article "On Decoding of Correlative Level Coding Systems with Ambiguity Zone Detection" by J. Kobayashi and D. T. Tang, published in IEEE Trans. Commun. Technol., Vol. COM-19, No. 4, pp. 467–477, August 1971. Despite the fact that the detectors described in this article lead to a transmission quality falling slightly below to the quality achieved with the Viterbi detector, their implementation is many times simpler.

Naturally, it is also possible to employ in the post-detectors PD as shown in FIG. 4 and FIG. 5 final symbol detectors of a different kind in lieu of the simple final symbol detector FD employed there, for example, of the type described in the above article by Kobayashi and Tang. In order to achieve the correct correlation structure of the input signal $\tilde{a}_{k-M}$ of such a final symbol detector FD it will generally be necessary to adapt the impulse responses $p_k$ and $q_k$ of feedforward and feedback sections FFS and FBS derived hereinbefore to this correlation structure. Because it will be evident after the extensive explanations given hereinbefore how such an adaptation has to be effected, this adaptation will not be described any further for brevity.

It will also be clear from the foregoing that the procedure for dimensioning a non-adaptive post-detector on the basis of a priori knowledge of the main character of the transfer characteristic of transmission channel CH is so universal that this procedure can also be implemented for adaptive equalizer EQ and non-adaptive post-detectors PD of a different kind.

What is claimed is:

1. Apparatus for combating intersymbol interference and noise which are introduced into a data signal transmitted at a symbol rate 1/T by a dispersive transmission channel with a transfer characteristic, the transfer characteristic having a presumed main character, said apparatus comprising:
   (a) an input for receiving a transmitted data signal resulting from the dispersive transmission channel;
   (b) an adaptive equalizer having:
      (i) a fixed symbol detector for forming tentative symbol decision signals from an input signal; and
      (ii) at least one adaptive filter, having an input coupled with the input of the apparatus, for producing an output signal which is the input signal of the fixed symbol detector; and
   (c) a non-adaptive post-detector for forming final symbol decision signals from the tentative symbol decision signals utilizing an auxiliary signal derived from the transmitted data signal, which auxiliary signal is the input signal of the fixed symbol detector.

2. An apparatus as claimed in claim 1, wherein:
   (a) the non-adaptive post-detector also generates an error signal for controlling the adaptive equalizer; and
   (b) the adaptive equalizer includes a control input for receiving the error signal.

3. An apparatus as claimed in claim 2, wherein the adaptive equalizer is a linear equalizer.

4. A apparatus as claimed in claim 1 or 2, wherein the adaptive equalizer is a decision feedback equalizer.

5. An apparatus as claimed in claim 1 or 2, whereinthe post-detector comprises:
   (a) a receive filter connected to receive the input signal of the fixed symbol detector, the receive filter being matched to the presumed main character of the transfer characteristic of the transmission channel,
   (b) a feedforward section for forming a first cancelling signal for intersymbol interference in response to a number of consecutive ones of the tentative symbol decisions,
   (c) means for adding together an output signal of the receive filter and the first cancelling signal to form a summation signal, and
   (d) a final symbol detector for forming final symbol decision signals from the summation signal.

6. An apparatus as claimed in claim 5, wherein:
   (a) the post-detector also includes a feedback section for forming a second cancelling signal for post-cursive intersymbol interference in response to a number of consecutive ones of the final symbol decision signals; and
   (b) the means for adding adds the second cancelling signal, the output signal of the receive filter, and the first cancelling signal to form the summation signal.

7. An arrangement as claimed in claim 1, wherein the post-detector estimates the maximum-likelihood sequence of transmitted data symbols.

* * * * *